United States Patent
Olmos et al.

(10) Patent No.: US 10,609,796 B2
(45) Date of Patent: Mar. 31, 2020

(54) PROGRAMMABLE FEED-FORWARD REGULATION

(71) Applicant: OSRAM SYLVANIA Inc., Wilmington, MA (US)

(72) Inventors: Eliseo Carcamo Olmos, Apodaca (MX); Luis Manuel Leon Lara, Wilmington, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/763,809

(22) PCT Filed: Sep. 27, 2016

(86) PCT No.: PCT/US2016/054017
§ 371 (c)(1),
(2) Date: Mar. 27, 2018

(87) PCT Pub. No.: WO2017/054010
PCT Pub. Date: Mar. 30, 2017

(65) Prior Publication Data
US 2018/0324936 A1   Nov. 8, 2018

Related U.S. Application Data

(60) Provisional application No. 62/233,410, filed on Sep. 27, 2015.

(51) Int. Cl.
*H05B 37/02* (2006.01)
*G05F 1/00* (2006.01)
(Continued)

(52) U.S. Cl.
CPC ....... *H05B 41/2827* (2013.01); *H05B 33/089* (2013.01); *H05B 37/036* (2013.01); *H05B 37/038* (2013.01); *Y02B 20/348* (2013.01)

(58) Field of Classification Search
CPC .... H05B 39/09; H05B 41/34; H05B 33/0803; H05B 37/02; H05B 33/0842; H05B 41/28;
(Continued)

(56) References Cited

U.S. PATENT DOCUMENTS 7,099,163 B1   8/2006  Ying
2006/0284568 A1*  12/2006  Chang ................ H05B 41/2827
315/282
(Continued)

FOREIGN PATENT DOCUMENTS

WO   2010065598 A2   6/2010

OTHER PUBLICATIONS

Henderson, Richard, International Search Report and Written Opinion of the International Searching Authority for PCT/US2016/054017, dated Dec. 23, 2016, pp. 1-11, European Patent Office, Rijswijk, The Netherlands.

*Primary Examiner* — Minh D A
(74) *Attorney, Agent, or Firm* — Shaun P. Montana

(57) ABSTRACT

Programmable drivers (or power supplies) for solid state light sources are disclosed, on which output regulation is improved to expand the dimming range to 1% and reduce and/or remove flicker. Additional fault conditions are set up to avoid latching, and thus provide for a controllable restart feature. Such drivers include an isolated half bridge resonant converter with an improved control approach designed to regulate very low current though primary side in a feed-forward loop. Such drivers include both digital and analog loops that improve the performance in steady state and/or during transients, particularly for a lighting load, in comparison to a single full digital control.

17 Claims, 6 Drawing Sheets

(51) Int. Cl.
*H05B 41/282* (2006.01)
*H05B 33/08* (2020.01)
*H05B 37/03* (2006.01)

(58) Field of Classification Search
CPC .............. H05B 41/295; H05B 41/2827; H05B 41/3925; H05B 41/042; H05B 41/2822; H05B 41/282; H05B 41/2325; H05B 33/0815; H05B 33/0818; H05B 41/2828; H05B 41/3921; H05B 41/3927; H05B 37/029; H05B 37/0254; Y02B 20/202; H01F 38/10; B23K 9/1031; B23K 9/1037; F21Y 2101/02
See application file for complete search history.

(56) References Cited

U.S. PATENT DOCUMENTS

| | | | |
|---|---|---|---|
| 2008/0252231 A1* | 10/2008 | Huang | H05B 41/2855 315/254 |
| 2008/0259655 A1* | 10/2008 | Wei | H02M 3/335 363/21.18 |
| 2013/0015776 A1* | 1/2013 | Simi | H05B 33/0815 315/206 |
| 2013/0049589 A1 | 2/2013 | Simi | |
| 2014/0176008 A1* | 6/2014 | Harish Gopala Pillai | H05B 33/0809 315/291 |
| 2015/0042227 A1* | 2/2015 | Kumar | H05B 33/0815 315/85 |
| 2016/0374164 A1* | 12/2016 | Stevens, Jr. | H05B 33/0815 |

* cited by examiner

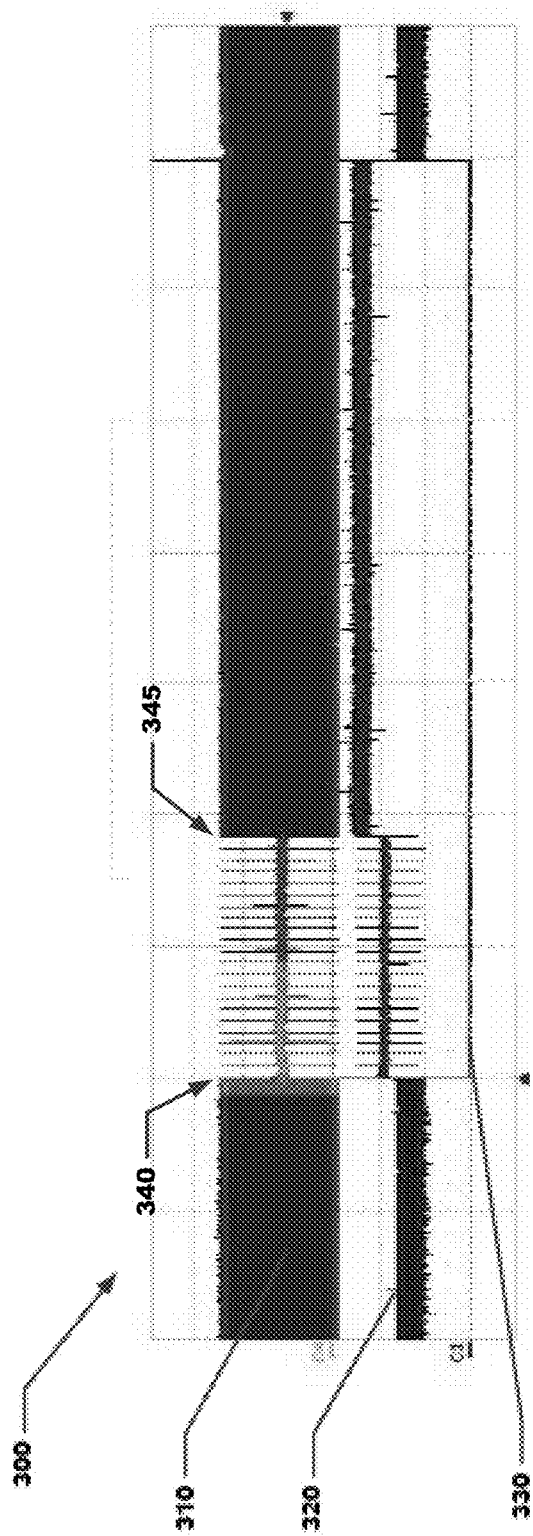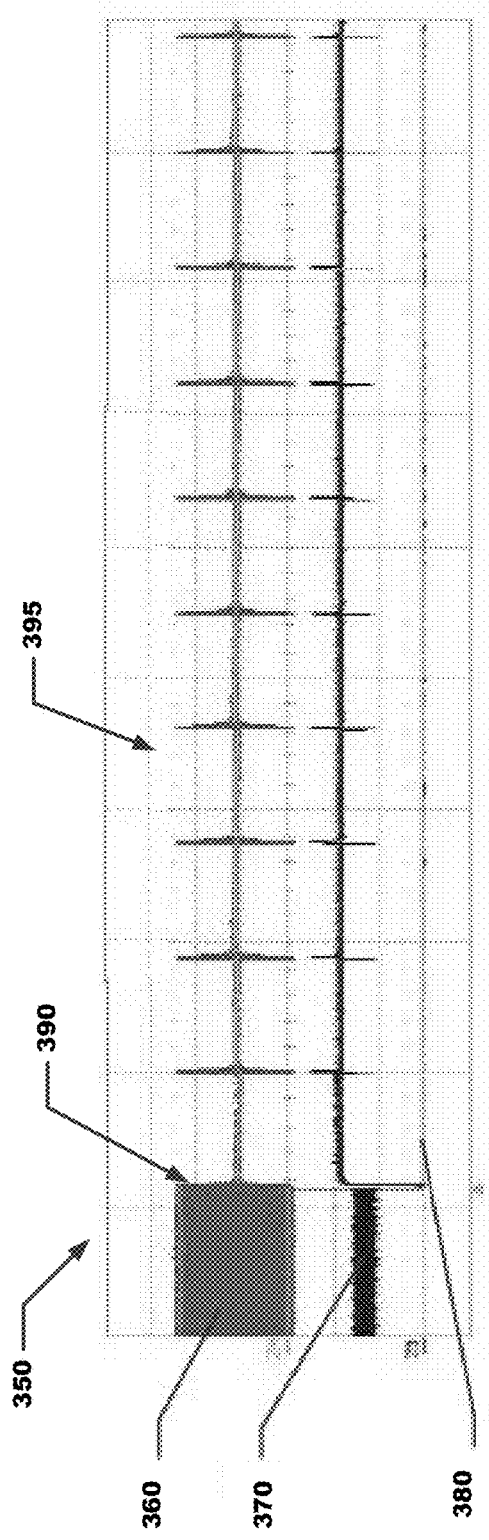

PROGRAMMABLE FEED-FORWARD REGULATION

CROSS-REFERENCE TO RELATED APPLICATION

The present application is a National Stage application of, and claims priority of, International Application No. PCT/US2016/054017, filed Sep. 27, 2016, which that claims the benefit of, and priority of, U.S. Provisional Patent Application No. 62/233,410, filed Sep. 27, 2015, the entire contents of which are hereby incorporated by reference.

TECHNICAL FIELD

The present invention relates to lighting, and more specifically, to electronics to drive one or more solid state light sources.

BACKGROUND

Light emitting diodes (LEDs) and other solid state light sources require a constant direct current (DC) voltage or current to operate optimally. During operation, the light source must be protected from line-voltage fluctuations. Changes in the forward voltage of a solid state light source can produce a disproportional change in current, which in turn can cause light output to vary, as light output is proportional to current and is rated for a current range. If current exceeds the manufacturer recommendations, the solid state light source may become brighter, but the light output may degrade at a faster rate due to higher temperatures within the device. This leads to a shorter useful life. Solid state devices in certain environments require a programmable driver with sufficient regulation to permit a wide range of operation and also provide dimming capabilities.

Programmable drivers enable dimming of the light sources. The solid state light sources are easily integrated with circuits to control dimming so that these functions respond to preset commands or occupant presence or commands. Dimming drivers dim the light sources by reducing the forward current, pulse width modulation (PWM) via digital control, or more sophisticated methods. Most dimming drivers operate using the PWM method. With this method, the frequency could range from a hundred modulations per second to as high as hundreds of thousands of modulations per second, so that the light source appears to be continuously lighted without flicker.

SUMMARY

A benefit of the PWM method of dimming is that it enables dimming with minimal color shift in the light output. According to the Lighting Research Center, dimming causes solid state light sources to experience a similar shift in spectral power distribution as an incandescent lamp. However, if colored solid state light sources in an array are used to produce white light, the amount of shift, particularly with red and yellow solid state light sources, may produce an undesirable effect on the white light that is produced by the system.

Dimming does not result in a loss of efficiency. During dimming, the solid state light sources are still operated at the same voltage and current as during full light output. In addition, life of the lighting device including the solid state light source(s) is not affected by dimming, as is sometimes the case with frequently dimmed fluorescent lighting. Rather, dimming may lengthen the useful life of the solid state light sources, because dimming can reduce operating temperatures inside the light source(s).

Programmable drivers also should handle fault conditions such as open load failures and shorted load failures. Preferably the programmable driver should be able to recover from these failures once the failure is rectified without requiring a complete system shutdown and restart.

Embodiments provide programmable drivers (or power supplies) for solid state light sources, on which output regulation is improved to expand the dimming range to 1% and reduce and/or remove flicker. Additional fault conditions are set up to avoid latching, and thus provide for a controllable restart feature. Embodiments include an isolated half bridge resonant converter with an improved control approach designed to regulate very low current though primary side in a feed-forward loop. In some embodiments, this is an LCC resonant converter, and in some embodiments other types of converters are used. Embodiments typically include galvanic topologies with primary current regulation. Compared to single analog primary side regulation, embodiments supply low current level down to milliamps in solid state lighting applications in a broader operating load range, with fast dynamic response and accuracy. Further, embodiments reduce the inconveniences of leakage current losses in the transformer, opto-coupler current transfer ratio thermal dependency, parasitic capacitances and flickering instability in low dimming current. Embodiments include both digital and analog loops that improve the performance in steady state, during transients, and lighting load, in comparison to a single full digital control.

Solid state light source drivers that provide constant current typically use analog primary side regulation and galvanic isolation with a flyback topology. However, such approaches also typically have core losses and leakage inductance when transferring the energy in the low current range down to milliamps due to inaccurate regulation in such level. On the other side a digital control is tied to a high speed A2D (analog-to-digital) converter and high clock rate so the processor can take all math regulation calculations in between each sample of the A2D converter. However there will be always dead time between sampling and adjusting the output causing some instability in the low current level range.

This mixed approach in a feed-forward configuration uses the benefits of analog and digital control loops, improving the dynamic response due to the analog response and by sensing the output current, through the digital loop, targeting the set point.

Embodiments protect against fault conditions, such as but not limited to output short circuit or open load disconnection, among others. The resonant converter on fault conditions will have relatively high current across magnetizing inductance becoming so excessive and may destroy the circuit. Some proposed solutions will detect these abnormal conditions and once it's triggered will switch off the half bridge and keep latch off; the only way to restart oscillation again is through disconnection of mainline power. This is not ideal; users would prefer a restart feature that would constantly monitor if the load returns to normal without the need for the user to reset the mainline power. Embodiments do provide such a restart feature.

In an embodiment, there is provided a regulation circuit. The regulation circuit includes a forward loop connectable to a primary side of a transformer, the forward loop sampling a load current at the primary side of a transformer as a half waveform proportional to the load current, the forward loop providing a first output connectable to a controller configured to regulate a solid state driver; and a feedback loop connectable to a secondary side of a transformer, the feedback loop providing a second output connectable to a controller configured to regulate the solid state driver.

In a related embodiment, the forward loop may include a half-bridge shunt circuit having a shunt circuit input and a shunt circuit output; a first series resistor having a first lead connected to the output of the half-bridge shunt circuit and a second lead; and a converter having an input connected to the second lead of the first series resistor and an output including the first output to regulate a solid state driver. In a further related embodiment, the half-bridge shunt may include a half bridge rectifier having a half-bridge rectifier input connected to the shunt bridge input, a half-bridge rectifier output connected to the shunt circuit output and a connection to ground; and a shunt resistor having a first lead connected to the shunt circuit output and a second lead connected to ground. In a further related embodiment, the half-bridge rectifier may include a first schottky diode having an anode connected to the half-bridge rectifier input, and a cathode connected to the half-bridge rectifier output; and a second schottky diode having an anode connected to ground and a cathode connected to the half-bridge rectifier input.

In another related embodiment, the feedback loop may include a Proportional Integral Derivative (PID) digital control programmable set point having a current sensing input capable of electrical communication with a first lead of a load, a voltage sensing input capable of electrical communication with a second lead of the load, a connection to an isolated ground, a user setting input, and an output; a second series resistor having a first lead connected to the output of the PID digital control programmable set point, and a second lead; an opto-coupler having a first input connected to the second lead of the second resistor, a second input connected to the isolated ground; a third input, and an output; a pull-up resistor having a first lead connected to a reference voltage, and a second lead connected to the third input of the opto-coupler; a filter having a first input connected to the output of the opto-coupler, a second input connected to ground, and an output; and a third series resistor having a first lead connected to the output of the filter and a second lead comprising the second output of the feedback loop.

In yet another related embodiment, the filter may include a fourth resistor having a first lead connected to the first input of the filter, and a second lead connected to the second input of the filter; a fifth resistor having a first lead connected to the first lead of the fourth resistor and a second lead connected to the output of the filter; and a first capacitor having a first lead connected to the output of the filter and a second lead connected to the second lead of the fourth resistor.

In still another related embodiment, the regulation circuit may further include a first voltage divider coupled to an anode of a third diode, the third diode having a cathode connectable to a reset input of the controller, the first voltage divider and the third diode setting a voltage for normal operation of the regulation circuit. In a further related embodiment, the first voltage divider may include a sixth resistor having a first lead connectable to a first side of the primary transformer and having a second lead; and a seventh resistor having a first lead connected to the second lead of the sixth resistor and having a second lead connected to ground.

In yet another related embodiment, the regulation circuit may further include an eighth resistor having a first lead connectable to a Direct Current (DC) bus and a second lead; a fourth diode having an anode connected to the second lead of the eighth resistor and a cathode connectable to the reset input of the controller; and a ninth resistor having a first lead connected to the cathode of the fourth diode and having a second lead connected to ground, the eighth resistor, the fourth diode, and the ninth resistor setting a voltage for a startup condition of the regulation circuit.

In still yet another related embodiment, the regulation circuit may further include a fault detection circuit coupled to a primary side of the transformer.

In yet still another related embodiment, the fault detection circuit may include a load open fault detection circuit and a load short fault detection circuit. In a further related embodiment, the load open fault detection circuit may include a second capacitor having a first lead connectable to a first side of a primary of the transformer and a second lead; a third capacitor having a first lead connected to the second lead of the second capacitor and having a second lead connected to ground; a fifth zener diode having a cathode connected to the second lead of the second capacitor and having an anode; a sixth zener diode having a cathode connected to the anode of the fifth zener diode and having a cathode; a tenth resistor having a first lead connected to the cathode of the fifth zener diode and having a second lead connected to ground; a seventh diode having a anode connected to the first lead of the tenth resistor and having a cathode; and an eleventh resistor having a first lead connected to the cathode of the third diode and having a second lead connected to an overcurrent protection input of the controller.

In a further related embodiment, in a load open condition, an excessive voltage may be detected by the second capacitor, the third capacitor, the fifth zener diode, and the sixth zener diode as higher than normal voltage over the tenth resistor, wherein the voltage over the tenth resistor may be high enough to cause the seventh diode to conduct, causing an over current status for a half-bridge shunt, that results in an instantaneous shut down of the controller.

In yet still another related embodiment, the load short fault detection circuit may include the half-bridge shunt; and the first voltage divider. In a further related embodiment, during a load short fault condition the voltage at the first voltage divider may drop below 0.3 volts and may reset the controller.

In another further related embodiment, a normal window for operation may be less than two volts and greater than 0.3 volts, the normal window voltage may be greater than 2 volts in an open load condition, and the normal window voltage may be less than 0.3 volts in a load short condition.

In still yet another related embodiment, the forward loop may sample the load current at the primary side of a transformer on a cycle by cycle basis.

In yet another related embodiment, the regulation circuit may further include a load connectable to the feedback loop.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3A shows a first graph for a short circuit detection and recovery voltage according to embodiments disclosed herein.

FIG. 3B shows a second graph for a short circuit detection and attempted recovery voltage according to embodiments disclosed herein.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1:
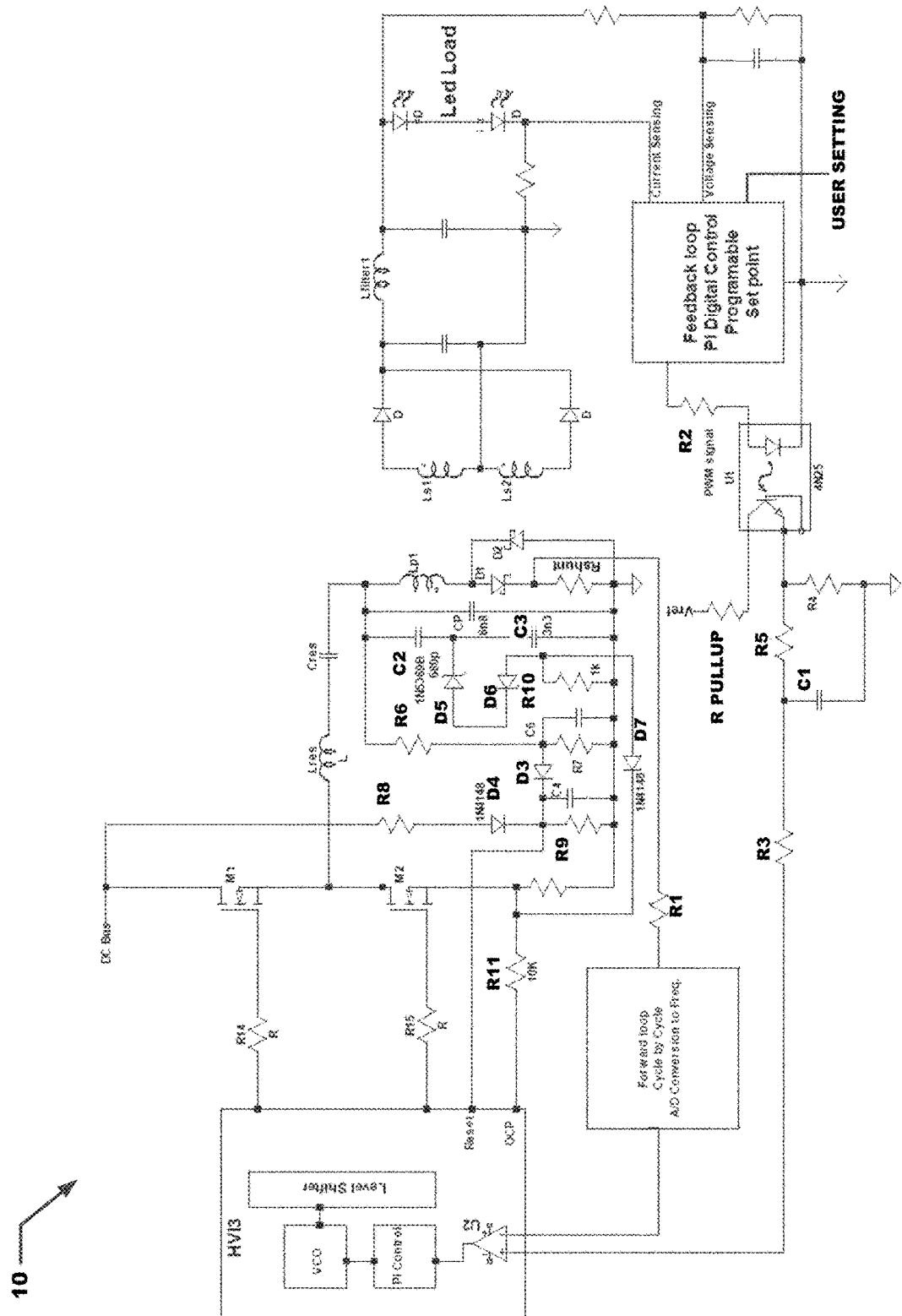
FIG. 1 depicts a schematic diagram of a particular circuit for providing programmable feed-forward regulation according to embodiments disclosed herein.

Referring to FIG. 1, the LCC configuration in a DC-DC half bridge isolated topology is used for wide load operation and through the forward loop samples the load current at the primary transformer side as half waveform proportional to the load current, cycle by cycle. In other words, typically a forward loop on LCC configuration means that magnetizing current over the transformer is forwarded to the secondary on both half bridge cycles and current sensing can be done on the primary side on each cycle. However, in embodiments it is done just when the low side is on, which is good enough to have a real value of power being transferred. This current is rectified for signal conditioning purposes and integrated as average DC and compared with a set point (coming from the opto-coupler) and the error gets to the ASIC in charge to convert it to a frequency change. This is done cycle by cycle. During the commutation of the bottom transistor through a shunt resistor, this depicts the non-linear characteristics because of the Schotky diode D1 and the parasitic of the transformer, as seen in FIG. 1. The error amplifier U2 is fed with the forward loop and adjustable voltage reference in comparison to the positive input.

In some embodiments, the forward loop is connectable to a primary side of a transformer, the forward loop samples a load current at the primary side of a transformer as a half waveform proportional to the load current, and the forward loop provides a first output connectable to a controller for regulating a solid state driver.

The forward loop includes a half-bridge shunt circuit having a shunt circuit input and a shunt circuit output. The forward loop also includes a first series resistor (R1) having a first lead connected to the output of the half-bridge shunt circuit and a second lead, and a converter having an input connected to the second lead of the first series resistor, and an output comprising the first output to regulate a solid state driver.

The half-bridge shunt comprises a half bridge rectifier having a half-bridge rectifier input connected to the shunt bridge input, a half-bridge rectifier output connected to the shunt circuit output and a connection to ground; and a shunt resistor (Rshunt) having an first lead connected to the shunt circuit output and a second lead connected to ground The half-bridge rectifier comprises a first schottky diode (D1) having an anode connected to the half-bridge rectifier input, and a cathode connected to the half-bridge rectifier output; and a second schottky diode (D2) having an anode connected to ground and a cathode connected to the half-bridge rectifier input. This assures high speed and positive sensing of input signal for forward loop controller.

The feedback loop is the combination of the opto-coupler and a digital algorithm of filtering, hysteresis adjustment and PID controller sensing the load current loop, which is adjustable according load variation, output current deviations and programmable setting.

In some embodiments, the feedback loop comprises a Proportional Integral Derivative (PID) digital control programmable set point having a current sensing input capable of electrical communication with a first lead of a load, a voltage sensing input capable of electrical communication with a second lead of the load, a connection to an isolated ground, a user setting input, and an output. The feedback loop further includes a second series resistor (R2) having a first lead connected to the output of the PID digital control programmable set point, and a second lead; an Opto-coupler having a first input connected to the second lead of the second resistor, a second input connected to the isolated ground; a third input, and an output; a pull-up resistor (RPullup) having a first lead connected to a reference voltage, and a second lead connected to the third input of the opto-coupler; a filter having a first input connected to the output of the opto-coupler, a second input connected to ground, and an output; and a third series resistor (R3) having a first lead connected to the output of the filter and a second lead comprising the second output of the feedback loop.

The filter comprises a fourth resistor (R4) having a first lead connected to the first input of the filter, and a second lead connected to the second input of the filter; a fifth resistor (R5) having a first lead connected to the first lead of the fourth resistor and a second lead connected to the output of the filter; and a first capacitor (C1) having a first lead connected to the output of the filter and a second lead connected to the second lead of the fourth resistor.

The feedback loop can change depending on the operation of the load and over the lifetime of the load. Over time, the load can degrade and the feedback loop can be adjusted to provide a same current.

By having the isolated inherent feedback, it is possible to swap the frequency along the resonance response of the tank, adjusting the load current considering load regulations and losses. The benefit of the forward loops is to reach low levels of regulations and the contribution of the feedback loop is to adjust load variations in a wider range. For the opto-coupler, the conversion is simply current to PWM signal and can be adjusted accordingly to output levels. In some embodiments, a PWM frequency of 500 Hz is used, but in some embodiments, higher frequencies (such as but not limited to 550 Hz, 600 Hz, 625 Hz, 665 Hz, and so on) are used.

The circuit also includes a fault detection circuit coupled to a primary side of the transformer. The fault detection circuit includes a load open fault detection circuit and a load short fault detection circuit. The load open fault detection circuit comprises a second capacitor (C2) having a first lead connectable to a first side of a primary of the transformer and a second lead; a third capacitor (C3) having a first lead connected to the second lead of the second capacitor and having a second lead connected to ground; a fifth zener diode (D5) having a cathode connected to the second lead of the second capacitor and having an anode; a sixth zener diode (D6) having a cathode connected to the anode of the fifth zener diode and having a cathode; a tenth resistor (R10) having a first lead connected to the cathode of the fifth zener diode and having a second lead connected to ground; a seventh diode (D7) having a anode connected to the first lead of the tenth resistor and having a cathode; and an eleventh resistor (R11) having a first lead connected to the cathode of the third diode and having a second lead connected to an overcurrent protection input of the controller.

In case of a load open condition, an excessive voltage is detected by the second capacitor, the third capacitor, the fifth zener diode, and the sixth zener diode as higher than normal voltage over the tenth resistor, wherein the voltage over the tenth resistor is high enough to cause the seventh diode to conduct, causing an over current status for a half-bridge shunt, that results in an instantaneous shut down of the controller.

In some embodiments, the load short fault detection circuit comprises the half-bridge shunt and the first voltage divider. In the event of a load short fault condition, the voltage at the first voltage divider drops below 0.3 volts and resets the controller.

The process to recover from a load open condition is through the reset input of the controller. The voltage must exit a normal window and get back to normal in a way such that switching starts normally after a shutdown timer expires. If the open load condition continues, shut down occurs again. When the open load condition goes away, the load is driven at a specified current and voltage.

Regarding the restarting feature, the primary side transformer voltage is sensed by the window comparator, and normal condition is between two levels as shown in Table 1.

TABLE 1

| Condition | Voltage Level | |
|---|---|---|
| Load Open | >2 | Set Fmax |
| Normal load regulation window | 2 | Max |
| | 1.5 | Typical |
| | 0.3 | Min |
| Load short | <0.3 | Set Fmax |

Once a fault condition triggers the driver to shut down, and oscillation is stopped, the sensed voltage will eventually be out of this window. By moving out the DC level, the driver is reset and the oscillation is restarted to detect the load conditions. This becomes a kind of secured burst mode while the fault condition is maintained. If the fault condition is removed, the voltage on the primary side will get back to a normal level and the start up process also begins.

Figure 2A:
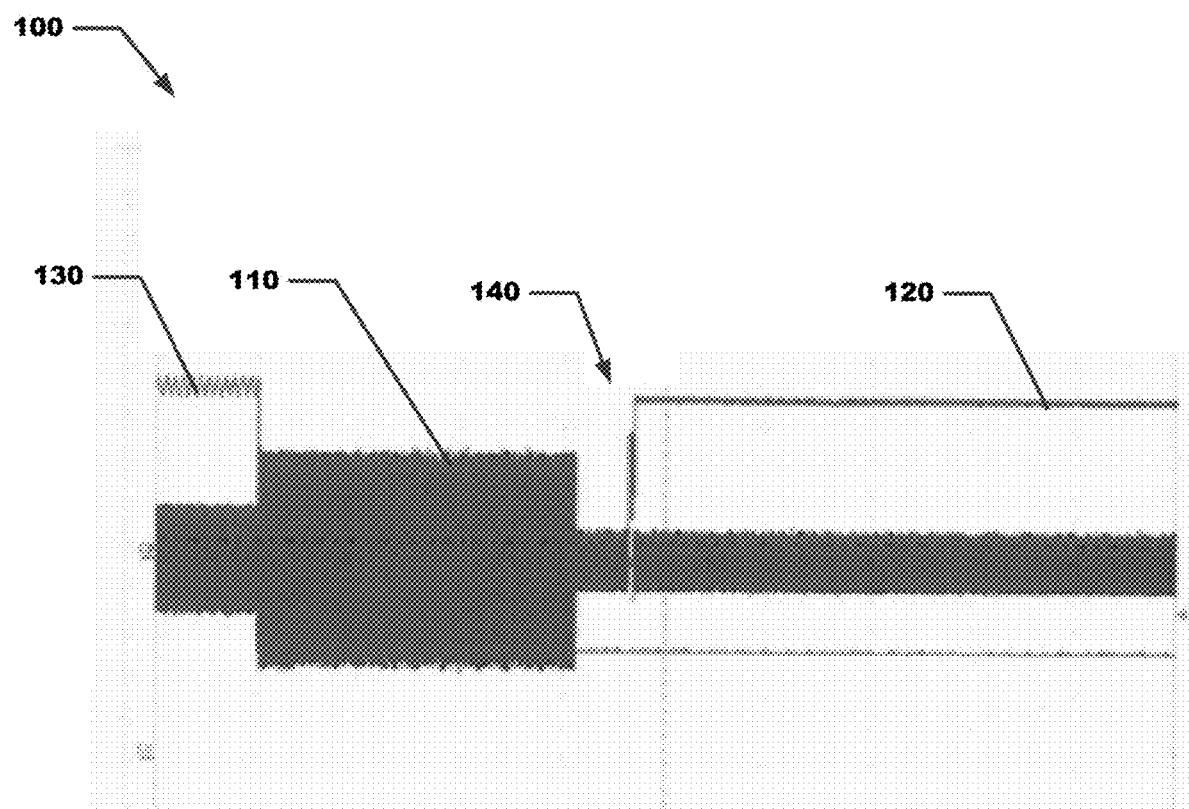
FIG. 2A depicts a first graph showing output current, input control used to restart after shutdown and transformer output voltage according to embodiments disclosed herein.
Figure 2B:
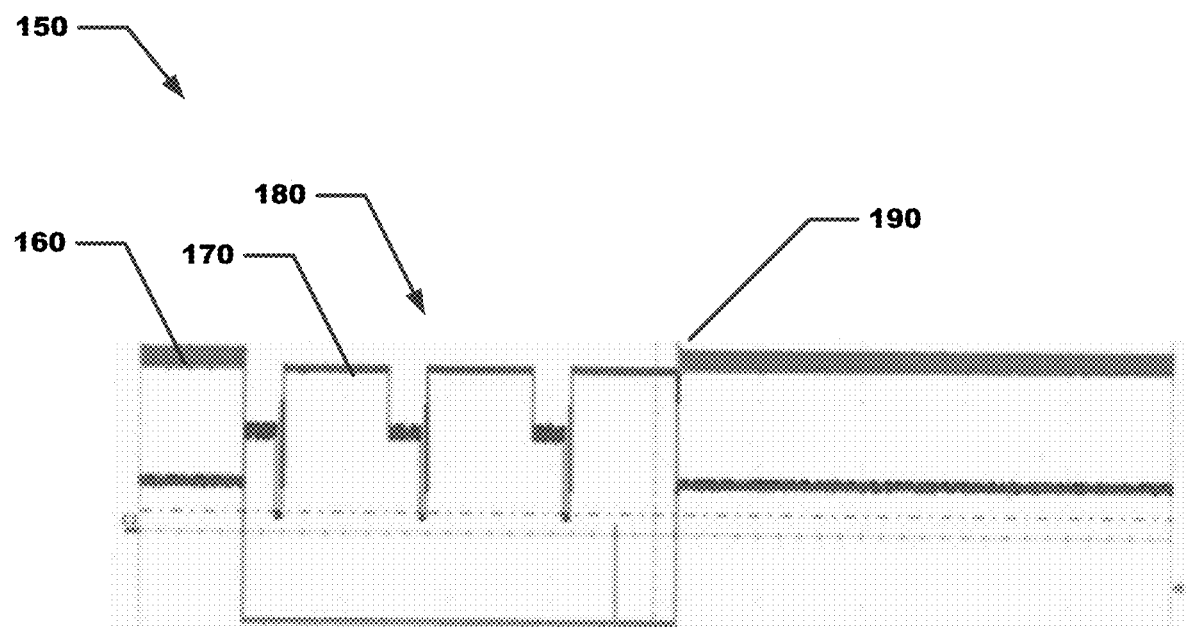
FIG. 2B depicts a second graph showing output current, input control used to restart after shutdown and transformer output voltage according to embodiments disclosed herein.

Shut down on short circuit is done by over current sensing of the half-bridge shunt. In case of an open load, the overvoltage protection C2, C3 divider together with D5, D6, and R10 are in charge to get the driver to shut down. Restart is detected by rise edge voltage of window comparator translated to reset input of controller, as seen in FIGS. 2A and 2B.

In embodiments, the target current for the load (i.e., one or more solid state light sources or any other appropriate lighting load) occurs on the secondary side, which is truly measuring the current load and in case of dimming, or fallback due to over power, over voltage, and so on, can change accordingly.

The current set point information is not necessarily small as the current being set, for two reasons. First is that due to use of a microcontroller, the current setting is converted to a PWM signal, which avoids the linearity problems of the opto-coupler or any other element. Second, on the primary side, the PWM signal is converted to a DC value, which does not have to be in millivolts, it is better to use a resistor divider and additional filtering, so low level settings are not transferred like so low levels to primary, avoiding noise issues. Additionally the op-amp inside this IC has noise rejection and was specially designed to handle a few milli-amps for dimming applications (e.g., 1% dimming, means less than 10 mA output).

Thus, in embodiments, on the primary side, there is a control loop that is cycle by cycle sensing the current load and regulating it according to the information that comes from the secondary side as a set point target. The regulation on the primary side is done by changing the frequency accordingly. Should the primary measurement include error, this primary measurement may also have to compensate for mistakes due to the opto-coupler and the LCC resonant converter. This is especially applicable when the driver is able to handle a wide range of loads, as shown in FIGS. 3A and 3B. Due to load changes, an error exists on the primary side current sensing if alone. Once the secondary side current is measured, the current target is passed to the primary isolated way, which prevents any drift (due to, for example but not limited to, temperature, load, tolerances etc.) on a current over a wide load range.

Referring now to FIG. 2A, a graph 100 is shown. The graph 100 shows an input control 110, the output current 130, a point where oscillations atop and try to restart 140 and the transformer output voltage 120. FIG. 2B shows a graph 150 showing output current 160, input control 170, the control trying to restart 180 and the restarted output current 190.

Referring now to FIG. 3A, a graph 300 is shown. The graph 300 shows an output voltage on the primary side transformer 310, an EOL input control 320 used for restart after shutdown and output current 330. Also shown are the point where the short circuit condition is detected 340 and where the condition is recovered 345.

In FIG. 3B, a graph 350 is shown. The graph 350 shows an output voltage on the primary side transformer 360, an EOL input control 370 used for restart after shutdown and output current 380. In the graph 350, the short circuit is detected at point 390 and repeated restarts 395 are tried but will not complete until the short circuit is removed.

Figure 4A:
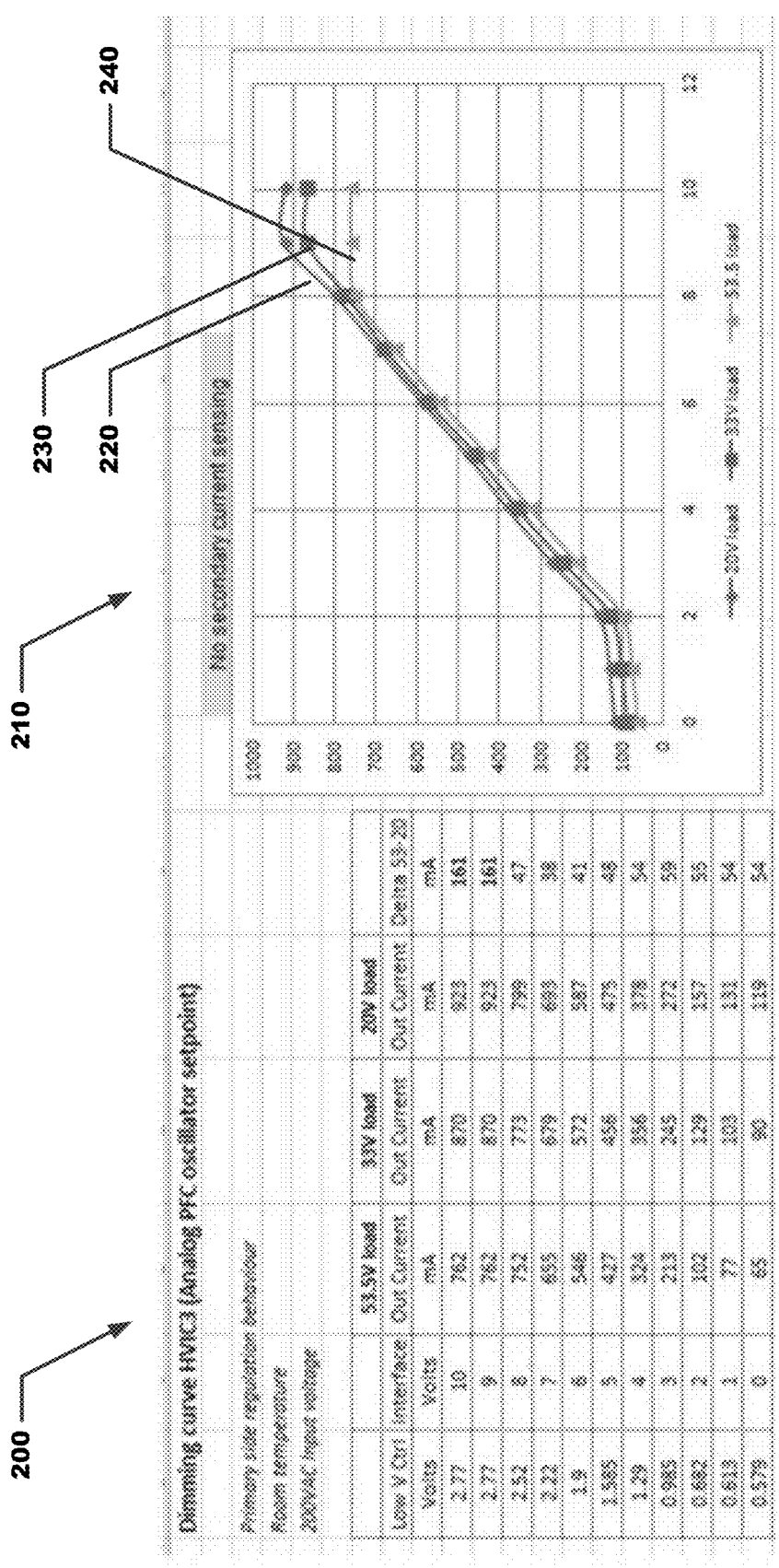
FIG. 4A shows a table and graph for a dimming curve with no secondary current sensing.
Figure 4B:
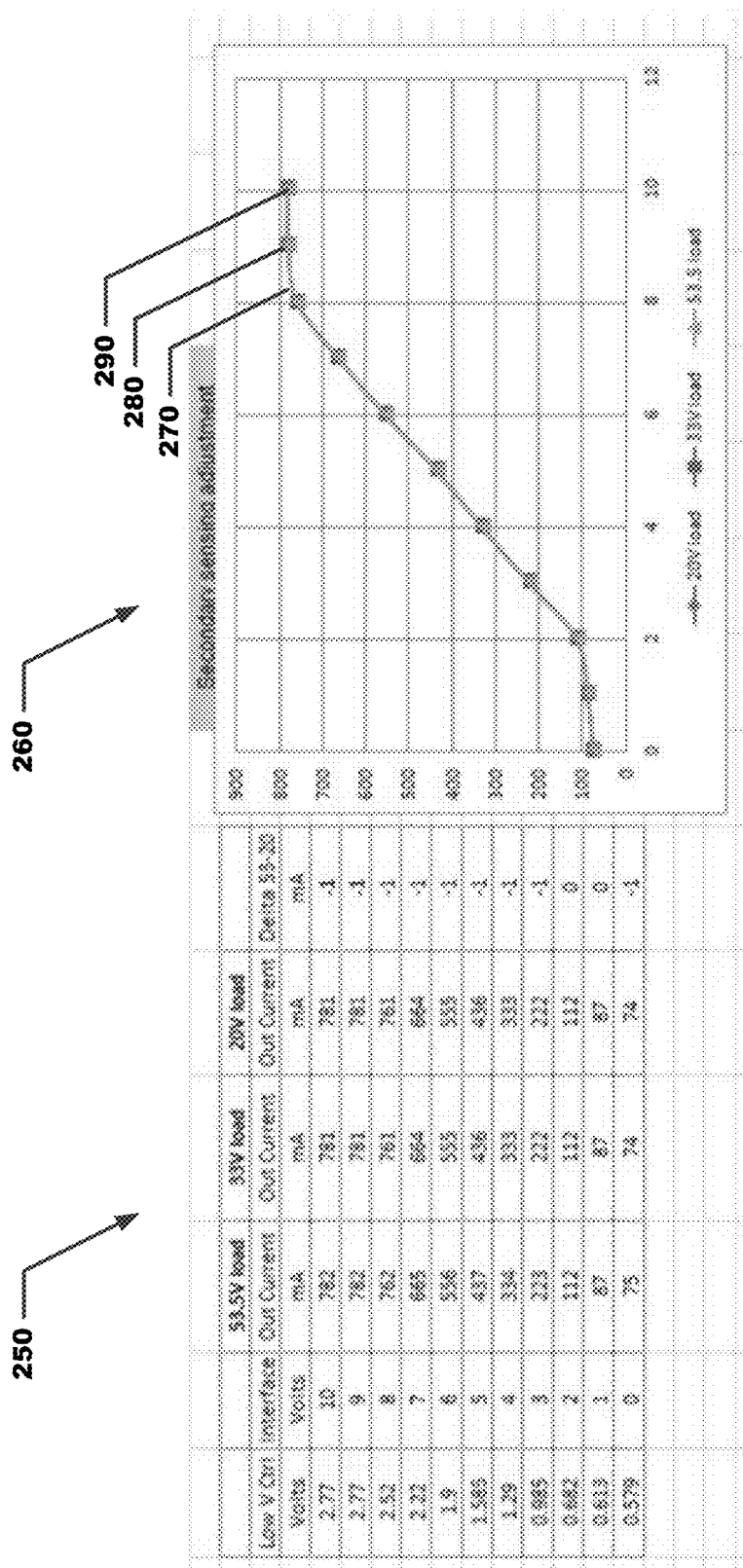
FIG. 4B shows a table and graph for a dimming curve with secondary current sensing according to embodiments disclosed herein.

FIGS. 4A and 4B show tables and graphs relating to the effect of not having secondary current sensing and having secondary current adjustment. Referring to FIG. 4A, a first table 200 is shown listing the various output currents at different loads. A graph 210 shows interface volts on the X-axis and output current on the Y axis. The curve for 20 volts is 220, the curve for 33 volts is 230 and the curve for 53.5 volts is 240. It can be seen from the graph 210 that the lines differ by a certain amount almost continually though the range of interface volts. FIG. 4B shows a table 250 listing the various output currents at different loads. A graph 260 shows interface volts on the X-axis and output current on the Y axis. The curve for 20 volts is 270, the curve for 33 volts is 280 and the curve for 53.5 volts is 290. It can be from the graph 260 that the lines are just about identical continually though the range of interface volts. This shows that implementing secondary sensing adjustment provides a same response regardless of the load voltage.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A regulation circuit comprising:
   a forward loop connectable to a primary side of a transformer, the forward loop sampling a load current at the primary side of a transformer as a half waveform proportional to the load current, the forward loop providing a first output connectable to a controller configured to regulate a solid state driver; and
   a feedback loop connectable to a secondary side of a transformer, the feedback loop providing a second output connectable to a controller configured to regulate the solid state driver;

wherein the forward loop comprises:
   a half-bridge shunt circuit having a shunt circuit input and a shunt circuit output;
   a first series resistor having a first lead connected to the output of the half-bridge shunt circuit and a second lead; and
   a converter having an input connected to the second lead of the first series resistor and an output comprising the first output to regulate a solid state driver.

2. The regulation circuit of claim 1, wherein the half-bridge shunt comprises:
   a half bridge rectifier having a half-bridge rectifier input connected to the shunt bridge input, a half-bridge rectifier output connected to the shunt circuit output and a connection to ground; and
   a shunt resistor having a first lead connected to the shunt circuit output and a second lead connected to ground.

3. The regulation circuit of claim 2, wherein the half-bridge rectifier comprises:
   a first schottky diode having an anode connected to the half-bridge rectifier input, and a cathode connected to the half-bridge rectifier output; and
   a second schottky diode having an anode connected to ground and a cathode connected to the half-bridge rectifier input.

4. The regulation circuit of claim 1, wherein the feedback loop comprises:
   a Proportional Integral Derivative (PID) digital control programmable set point having a current sensing input capable of electrical communication with a first lead of a load, a voltage sensing input capable of electrical communication with a second lead of the load, a connection to an isolated ground, a user setting input, and an output;
   a second series resistor having a first lead connected to the output of the PID digital control programmable set point, and a second lead;
   an opto-coupler having a first input connected to the second lead of the second resistor, a second input connected to the isolated ground; a third input, and an output;
   a pull-up resistor having a first lead connected to a reference voltage, and a second lead connected to the third input of the opto-coupler;
   a filter having a first input connected to the output of the opto-coupler, a second input connected to ground, and an output; and
   a third series resistor having a first lead connected to the output of the filter and a second lead comprising the second output of the feedback loop.

5. The regulation circuit of claim 1, wherein the filter comprises:
   a fourth resistor having a first lead connected to the first input of the filter, and a second lead connected to the second input of the filter;
   a fifth resistor having a first lead connected to the first lead of the fourth resistor and a second lead connected to the output of the filter; and
   a first capacitor having a first lead connected to the output of the filter and a second lead connected to the second lead of the fourth resistor.

6. The regulation circuit of claim 1, further comprising a first voltage divider coupled to an anode of a third diode, the third diode having a cathode connectable to a reset input of the controller, the first voltage divider and the third diode setting a voltage for normal operation of the regulation circuit.

7. The regulation circuit of claim 6, wherein the first voltage divider comprises:
   a sixth resistor having a first lead connectable to a first side of the primary transformer and having a second lead; and
   a seventh resistor having a first lead connected to the second lead of the sixth resistor and having a second lead connected to ground.

8. The regulation circuit of claim 1, further comprising:
   an eighth resistor having a first lead connectable to a Direct Current (DC) bus and a second lead;
   a fourth diode having an anode connected to the second lead of the eighth resistor and a cathode connectable to the reset input of the controller; and
   a ninth resistor having a first lead connected to the cathode of the fourth diode and having a second lead connected to ground, the eighth resistor, the fourth diode, and the ninth resistor setting a voltage for a startup condition of the regulation circuit.

9. The regulation circuit of claim 1, further comprising a fault detection circuit coupled to a primary side of the transformer.

10. The regulation circuit of claim 1, wherein the fault detection circuit includes a load open fault detection circuit and a load short fault detection circuit.

11. The regulation circuit of claim 10, wherein the load open fault detection circuit comprises:
   a second capacitor having a first lead connectable to a first side of a primary of the transformer and a second lead;
   a third capacitor having a first lead connected to the second lead of the second capacitor and having a second lead connected to ground;
   a fifth zener diode having a cathode connected to the second lead of the second capacitor and having an anode;
   a sixth zener diode having a cathode connected to the anode of the fifth zener diode and having a cathode;
   a tenth resistor having a first lead connected to the cathode of the fifth zener diode and having a second lead connected to ground;
   a seventh diode having a anode connected to the first lead of the tenth resistor and having a cathode; and
   an eleventh resistor having a first lead connected to the cathode of the third diode and having a second lead connected to an overcurrent protection input of the controller.

12. The regulation circuit of claim 11, wherein, in a load open condition, an excessive voltage is detected by the second capacitor, the third capacitor, the fifth zener diode, the sixth zener diode as higher than normal voltage over the tenth resistor, wherein the voltage over the tenth resistor is high enough to cause the seventh diode to conduct, causing an over current status for a half-bridge shunt, that results in an instantaneous shut down of the controller.

13. The regulation circuit of claim 10, wherein the load short fault detection circuit comprises:
   the half-bridge shunt; and
   the first voltage divider.

14. The regulation circuit of claim 13, wherein during a load short fault condition the voltage at the first voltage divider drops below 0.3 volts and resets the controller.

15. The regulation circuit of claim 13, wherein a normal window for operation is less than two volts and greater than 0.3 volts, wherein the normal window voltage is greater than 2 volts in an open load condition, and wherein the normal window voltage is less than 0.3 volts in a load short condition.

16. The regulation circuit of claim 1, wherein the forward loop samples the load current at the primary side of a transformer on a cycle by cycle basis.

17. The regulation circuit of claim 1, further comprising a load connectable to the feedback loop.

\* \* \* \* \*